United States Patent
van Rens et al.

(10) Patent No.: US 11,719,794 B2
(45) Date of Patent: Aug. 8, 2023

(54) ULTRASOUND PROBE AND PROCESSING METHOD

(71) Applicant: KONINKLIJKE PHILIPS N.V., Eindhoven (NL)

(72) Inventors: Antonia Cornelia van Rens, Nuenen (NL); Bernard Joseph Savord, Andover, MA (US); Man Nguyen, Melrose, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 664 days.

(21) Appl. No.: 16/630,532

(22) PCT Filed: Jul. 10, 2018

(86) PCT No.: PCT/EP2018/068599
§ 371 (c)(1),
(2) Date: Jan. 13, 2020

(87) PCT Pub. No.: WO2019/011887
PCT Pub. Date: Jan. 17, 2019

(65) Prior Publication Data
US 2021/0080572 A1    Mar. 18, 2021

Related U.S. Application Data

(60) Provisional application No. 62/531,473, filed on Jul. 12, 2017.

(30) Foreign Application Priority Data

Jul. 24, 2017    (EP) .................................... 17182799

(51) Int. Cl.
G01S 7/52    (2006.01)
G01S 15/89    (2006.01)

(52) U.S. Cl.
CPC ........ *G01S 7/52026* (2013.01); *G01S 7/5208* (2013.01); *G01S 7/52033* (2013.01); *G01S 15/8915* (2013.01); *G01S 15/8963* (2013.01)

(58) Field of Classification Search
CPC ............. G01S 7/52026; G01S 7/52033; G01S 7/5208; G01S 15/8915; G01S 15/8963; G01S 7/52096; G01S 7/52038
See application file for complete search history.

(56) References Cited

U.S. PATENT DOCUMENTS

| 4,984,465 A | 1/1991 | Piel, Jr. et al. |
| 5,062,429 A | 11/1991 | Smith et al. |

(Continued)

FOREIGN PATENT DOCUMENTS

| JP | 2009531107 A | 9/2009 |
| JP | 2016530977 A | 10/2016 |

(Continued)

OTHER PUBLICATIONS

International Search Report and Written Opinion for International Application No. PCT/EP2018/068599, filed Jul. 10, 2018, 14 pages.

*Primary Examiner* — Luther Behringer
*Assistant Examiner* — Amy Shafqat

(57) ABSTRACT

An ultrasound probe in which there is local amplification, time gain compensation and digitization of each transducer element output. Inverting arrangements surround the time gain compensation and digitization units, and a synchronous inversion function enables deterministic distortion to be cancelled.

20 Claims, 5 Drawing Sheets

(56) References Cited

U.S. PATENT DOCUMENTS

| | | | |
|---|---|---|---|
| 6,267,725 | B1 | 7/2001 | Dubberstein |
| 7,901,358 | B2 | 3/2011 | Mehi et al. |
| 2005/0203391 | A1 | 9/2005 | Phelps et al. |
| 2005/0203392 | A1 | 9/2005 | Peteresen et al. |
| 2006/0173342 | A1* | 8/2006 | Panda .................. B06B 1/0292 |
| | | | 600/447 |
| 2007/0230759 | A1 | 10/2007 | Tamura |
| 2007/0291591 | A1 | 12/2007 | Peng et al. |
| 2010/0080083 | A1* | 4/2010 | Oswal ................. G01S 7/52033 |
| | | | 367/98 |
| 2016/0317123 | A1 | 11/2016 | Kinnon Dahlgren et al. |
| 2016/0356884 | A1 | 12/2016 | Guenther et al. |
| 2017/0097968 | A1 | 4/2017 | Colodny et al. |
| 2017/0100096 | A1 | 4/2017 | Min |

FOREIGN PATENT DOCUMENTS

| | | | |
|---|---|---|---|
| WO | 2015040524 | A1 | 3/2015 |
| WO | 2016057631 | A1 | 4/2016 |
| WO | 2016077822 | A1 | 5/2016 |
| WO | 2017097968 | A1 | 6/2017 |

\* cited by examiner

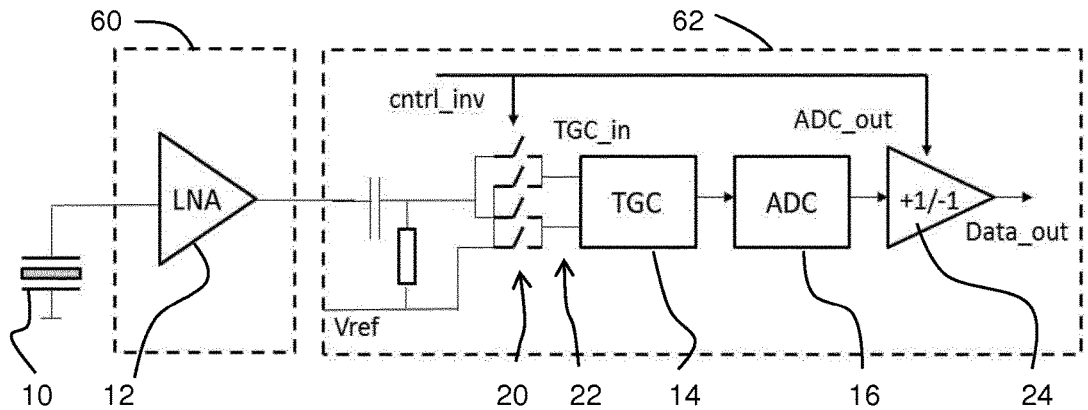
FIG. 6
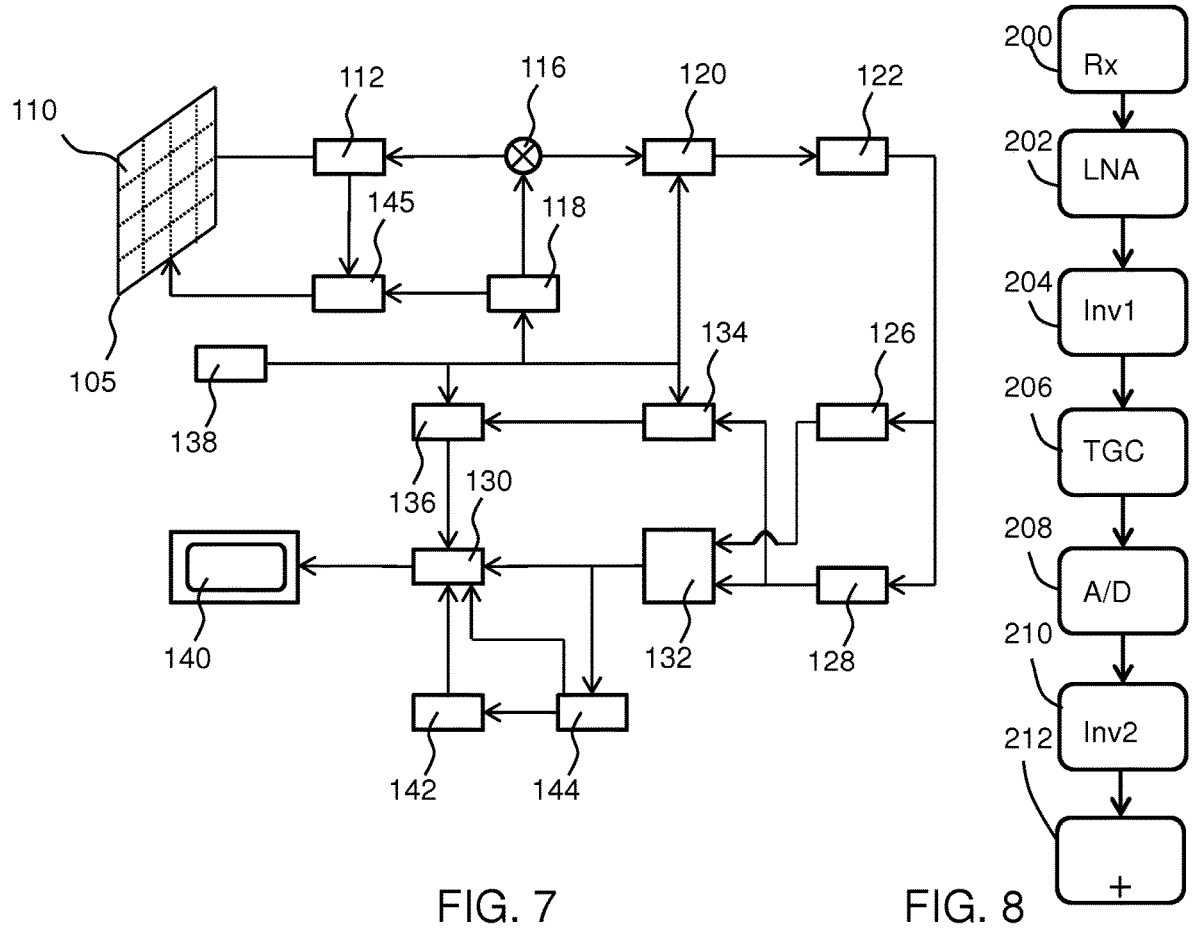
FIG. 7
FIG. 8

ULTRASOUND PROBE AND PROCESSING METHOD

RELATED APPLICATIONS

This application is the U.S. National Phase application under 35 U.S.C. § 371 of International Application No. PCT/EP2018/068599, filed on Jul. 10, 2018, which claims the benefit of European Application No. 17182799.1, filed Jul. 24, 2017 and of Provisional Application No. 62/531,473, filed Jul. 12, 2017. These applications are hereby incorporated by reference herein.

FIELD OF THE INVENTION

This invention relates to ultrasound systems and the processing of ultrasound signals and in particular relates to an ultrasound probe with in-probe signal digitization.

BACKGROUND OF THE INVENTION

Conventional ultrasound systems are large and expensive, but recently, also cheaper handheld ultrasound systems have become available. Due to the lower price, weight and increased user friendliness, systems of this type are available to a larger audience; e.g. to midwives in third world countries. In addition, high-end ultrasound systems are increasingly enabling 3D imaging at higher frame rates to be able to image quickly moving organ parts such as heart valves.

The ultrasound transducer probe is a crucial component in the ultrasound system. In practice, the probe specifications determine the image quality and frame rate. The price of a regular probe is high and often dominated by the composite cable that contains up to 128 coaxial wires to transfer the analog echo signals from the probe head to the ultrasound system. A reduction in cost of the probe therefore is highly desirable. On top of that, there is an interest in realization of wireless probes for increased maneuverability and wearable ultrasound and probes that support high frame rate 3D imaging.

All these aspects can be addressed by performing in-probe digitization of the raw ultrasound echo signals in combination with in-probe data compression. One of the main challenges of in-probe digitization is to keep the dissipation sufficiently low. Due to safety regulations, the allowed heating of ultrasound probes is restricted. In addition, the limited power capacity of USB-supplied interfaces and limited energy capacity of battery fed probes/systems put severe limitations on the acceptable dissipation.

Document US 2005/203391 A1 relates to continuous wave ultrasound imaging. In particular, transmitters and channel count reduction are provided for steered continuous wave Doppler ultrasound imaging.

Similarly, published patent application US 2005/203392 A1 discloses circuits and associated methods for minimizing channels in ultrasound imaging systems. In particular, the document provides circuits, controllers and methods for combining signals from multiple elements onto a same path.

The dissipation of regular ultrasound system front ends is high due to severe requirements on signal distortion particularly for harmonic imaging. Signal distortion introduces higher harmonic signal components which interfere with tissue harmonics and reduce harmonic image quality. In particular, this is the case when imaging deep tissue. Attenuation of the pressure wave in the forward direction means that relatively weak harmonic signals are also generated at those large tissue depths. The generated harmonic signals are also attenuated more than the reflected fundamental components due to frequency-dependent tissue attenuation. In such cases, the received harmonic signals may be up to 40 dB (example) weaker than the reflected fundamental signals.

Thus, there are difficulties processing the higher harmonic ultrasound signals with low cost electronics as a result of electronic distortion. There is therefore a need for a probe design and processing method which enables low cost in-probe digitization of the ultrasound echo signals, particularly to enable harmonic imaging which is desirable for deep tissue imaging.

SUMMARY OF THE INVENTION

According to examples in accordance with an aspect of the invention, there is provided an ultrasound probe comprising:
  an array of ultrasound transducer elements;
  a respective signal processing circuit associated with each transducer element, wherein each signal processing circuit comprises:
    an amplifier for receiving a signal from the transducer element;
    a time gain compensation circuit; and
    an analog to digital converter circuit connected to an output of the time gain compensation circuit,
  wherein each signal processing circuit further comprises:
    a switch arrangement at the output of the amplifier for generating an intermediate two-terminal output from the amplifier output directly or with inversion, wherein the intermediate two-terminal output is provided to an input of the time gain compensation circuit, and an inverter at the output of the analog to digital converter, wherein the inverter is controlled synchronously with the switch arrangement.

In this ultrasound probe, there is local digitization of the transducer element signal after amplification and time gain compensation.

A signal inversion system is used that is able to correct for at least even harmonic distortion in the receiving analog frontend, which is of particular interest for harmonic imaging. In this way, the requirements on signal distortion in the analog frontend can be relaxed and lower dissipation is feasible. There is analog inversion before the time gain compensation and digital inversion after analog to digital conversion (i.e. before subsequent beamforming).

The device preferably comprises a controller for controlling the ultrasound transducer elements to emit ultrasound pulses, for controlling the switch arrangement and for controlling the inverter, and a signal processor for processing received reflected ultrasound pulses.

This defines an ultrasound imaging system.

The controller is then preferably adapted to implement two cycles:
  a first cycle in which the switch arrangement and the inverter each provide no inversion; and
  a second cycle in which the switch arrangement and the inverter each provide inversion.

By synchronizing inversion operations (before the time gain compensation and after the analog to digital conversion) there is no overall effect on the desired harmonic signals, but electronic distortion between the two inversion stages can be cancelled by combining inverted and non-inverted versions of the signals.

The controller is for example adapted to switch between the first and second cycles between ultrasound pulse emissions. For example, the inversion setting for a cycle is held while listening to echo signals (for example capturing a data stream of 50 to 100 µs). By way of example, the ultrasound pulses may be emitted with a center frequency of 2.5 MHz.

Thus, sequential ultrasound pulses are processed with opposite inversion setting. Instead, there may be a sequence of pulses between each inversion operation.

The signal processor is preferably adapted to combine the received reflected ultrasound pulses for successive first and second cycles. In this way, deterministic electronic distortion can be cancelled by the addition of opposite phase components.

The controller is for example adapted to apply opposite polarity to successive pulse emissions (i.e. pulse transmissions). This defines a pulse inversion scheme. The advantage of this is that both odd and even harmonic distortion components can be corrected. In a system without pulse inversion, only even harmonics are corrected.

The signal processor is preferably adapted to process harmonics of the fundamental frequency of the emitted ultrasound pulses. The invention is of particular interest for a harmonic imaging system.

The inverter may comprise a bit inverter for the most significant bit of the output of the analog to digital converter. This provides a simple inversion system based on representation of negative (inverted) values of a digital word using the most significant bit value.

In some examples, the amplifier has a differential output. The switch arrangement then selectively flips the outputs. Alternatively, there may be a reference (which may be considered again to be a second output of the amplifier) and a single output, which are flipped by the switch arrangement.

The switch arrangement for example comprises four switches, with a first between a first amplifier output and a first time gain compensation circuit input, a second between the first amplifier output and a second time gain compensation circuit input, a third between a second amplifier output and the first time gain compensation circuit input and a fourth between the second amplifier output and the second time gain compensation circuit input.

Examples in accordance with another aspect of the invention provide a method of processing ultrasound signals comprising:

receiving signals from an array of ultrasound transducer elements, and at each transducer element:

amplifying the respective signal;

generating an intermediate two-terminal output from the amplified signal, selectively either directly or with inversion;

performing time gain compensation to the intermediate two-terminal output;

performing analog to digital conversion; and selectively performing inversion of the digital signal synchronously with the inversion used to generate the intermediate signal.

This method enables cancellation of electronic distortion arising from the time gain compensation and analog to digital conversion processes.

The method may further comprise controlling the ultrasound transducer elements to emit ultrasound pulses and processing received reflected ultrasound pulses, wherein the controlling implements two cycles:

a first cycle in which the switch arrangement and the inverter each provide no inversion; and a second cycle in which the switch arrangement and the inverter each provide inversion.

Switching between the first and second cycles may then be between ultrasound pulse emissions. The method may comprise applying opposite polarity to successive pulse emissions and combining the received reflected ultrasound pulses for successive first and second cycles. This enables compensation for odd and even harmonic distortion.

The invention may be implemented at least in part in computer software.

BRIEF DESCRIPTION OF THE DRAWINGS

Examples of the invention will now be described in detail with reference to the accompanying drawings, in which:

FIG. 6 shows a second implementation of a signal processing circuit for a single transducer element, in accordance with an example of the invention;

FIG. 7 is a system diagram to show the general operation of an exemplary ultrasound diagnostic imaging system; and FIG. 8 shows an ultrasound image processing method.

DETAILED DESCRIPTION OF THE EMBODIMENTS

The invention provides an ultrasound probe in which there is local amplification, time gain compensation and digitization of each transducer element output. Inverting arrangements surround the time gain compensation and digitization units, and a synchronous inversion function enables deterministic distortion to be cancelled.

Figure 1:
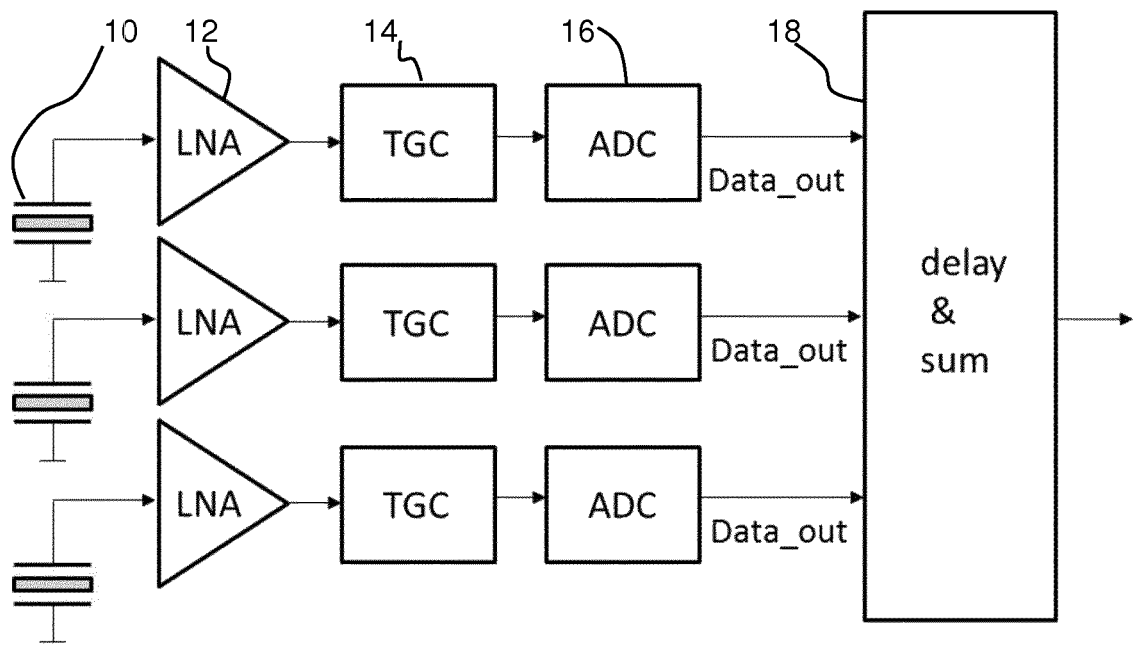
FIG. 1 shows a basic arrangement for providing in-probe digitization.

FIG. 1 shows a basic arrangement for providing in-probe digitization.

The probe comprises a transducer array comprising hundreds or thousands of transducer elements 10, three of which are shown for purposes of illustration. Each transducer element 10 has a signal processing circuit comprising a low noise amplifier (LNA) 12, a time gain compensation (TGC) circuit 14 and an analog to digital converter (ADC) 16. The TGC circuit 14 may be implemented partly in the LNA 12. In that case, typically first the LNA gain steps are increased. When the LNA gain is at a maximum level, the TGC settings for the second stage are changed. Time gain compensation is a setting applied in diagnostic ultrasound imaging to account for tissue attenuation. By increasing the received signal intensity with depth, the artifacts in the uniformity of a B-mode image intensity are reduced.

This system requires the implementation of hundreds to thousands of analog to digital converters (ADCs) to convert the ultrasound echo signals of the individual elements.

The digital output signals of the ADCs (Data_out) are applied to beamforming circuitry 18 which performs delay and sum operations. Due to constructive or destructive interference, the energy originating from certain directions is amplified while energy originating from other directions is attenuated.

Errors that happen in the analog electronics impact the quality of the beamformed output signals. Uncorrelated errors (e.g. LNA noise and random linearity errors in the ADCs) have relatively low impact as they sum stochastically and therefore their contribution reduces with an increasing amount of transducer elements. Correlated errors (e.g. signal distortion and systematic ADC errors) have more impact as the errors sum deterministically and therefore their contribution does not scale with number of transducer elements.

This could mean that for a 100 channel array, the noise level of an individual LNA may be −50 dB relative to the (peak) input signal, while the requirement on signal distortion could be −60 dB (example).

As indicated above, the most severe distortion requirements are valid for harmonic imaging modes, especially when imaging at large depth where signals already are relatively weak. In this case, the LNA signal swing will be limited while the signal swing of the TGC circuit 14 and the ADC 16 will be programmed to be at maximum level (full swing). As the signal distortion increases with signal swing, distortion is likely to be dominated by the TGC circuit 14 and the ADC 16. Therefore, compensation of distortion of TGC circuit 14 and (analog parts of the) ADC 16 is desired.

Figure 2:
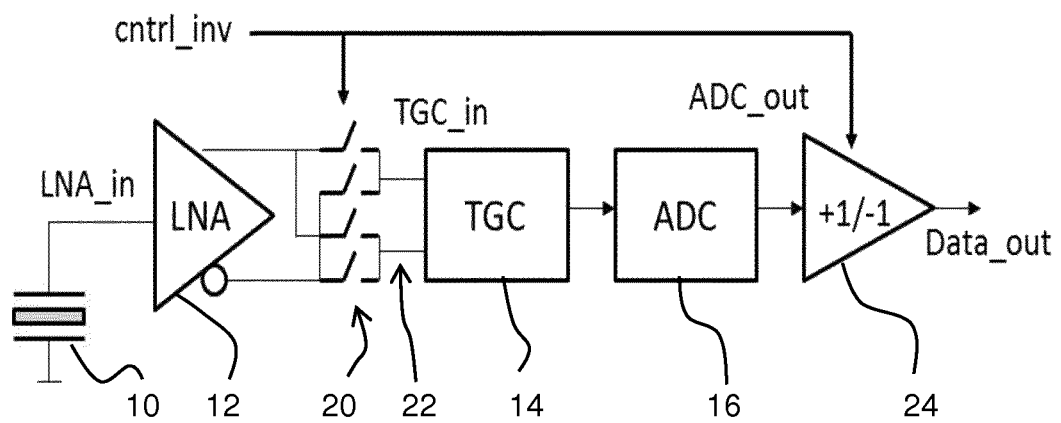
FIG. 2 shows a first implementation of a signal processing circuit for a single transducer element, in accordance with an example of the invention.

FIG. 2 shows a signal processing circuit for a single transducer element of multiple transducer elements in the transducer array, in accordance with an example of the invention.

The signal processing circuit again comprises an amplifier 12, a time gain compensation circuit 14 and an analog to digital converter 16.

In addition, there is a switch arrangement 20 at the output of the amplifier 12 for generating an intermediate two-terminal (i.e. differential or quasi-differential) output 22 from the amplifier output directly or with inversion. The switch arrangement thus performs an analog chopping function. An inverter 24 is provided at the output of the analog to digital converter 16 for digital signal inversion and it is controlled synchronously with the switch arrangement 20. The control signal for the inversion process is shown as cntrl_inv.

In the example of FIG. 2, the amplifier 12 has a differential output, namely a non-inverted output and an inverted output. The switch arrangement 20 either routes these directly to the intermediate two-terminal output 22 or it flips them around.

The signals passing through the signal processing circuit are thus dual polarity (i.e. AC) signals, including the digital output of the ADC 16. Digital words at the output may be encoded as a bit sequence including a sign bit, such as the most significant bit. In such a coding scheme, the inverter 24 is simply for selectively swapping the sign bit between 1 and 0. However, other coding schemes may be used.

In use of an ultrasound system, a controller controls the ultrasound transducer elements 10 to emit ultrasound pulses. These may have a frequency in the MHz range tuned to the resonance frequency of the transducer element 10, such as in the range 3 to 5 MHz. By way of example, the center frequency may be 2.5 MHz (i.e. a period of 0.4 µs). The reflected echo signals for such a pulse are listened to typically for a few hundred cycles (e.g. 50 to 100 µs).

The received reflected echo signals comprise the superposition of multiple reflection signals.

During this 100 µs time window, the inversion setting "cntrl_inv" remains static. A stream of data words is generated by the ADC 16, and these are either inverted or not depending on the inversion setting. The switching of the inversion setting takes place between echo pulse reception, when the signal is not critical.

The inversion settings give rise to two cycles: a first cycle in which the switch arrangement 20 and the inverter 24 each provide no inversion and a second cycle in which the switch arrangement 20 and the inverter 24 each provide inversion. For the first cycle, cntrl_inv is high (=1), the output signal of the LNA 12 is applied without inversion to the TGC circuit 14 and the digital output word of the ADC 16 is not inverted. If cntrl_inv is low (=0), the output signal of the LNA 12 is inverted before the TGC circuit 14 and again in the digital domain after the ADC 16.

The ADC sampling period may for example be 40 MHz, and may give a signal range [−127, +127] coded in binary form.

The amplifier 12 may have fixed gain or time varying gain. If it has a fixed gain, the output signal is large directly after the pulse transmission event while the signal strength reduces exponentially over time.

The LNA may be part of the TGC circuit 14 of the channel (not shown), and in this case the output signal of the LNA is constant (and large) for some time (e.g. 10 µA) after the transmission event has happened. To be able to achieve this, the LNA gain is controlled to grow exponentially during this time frame. Afterwards, the LNA gain is at a maximum level and will remain constant; from that time onwards the signal strength at the LNA output will show the exponential decay again.

Figure 3:
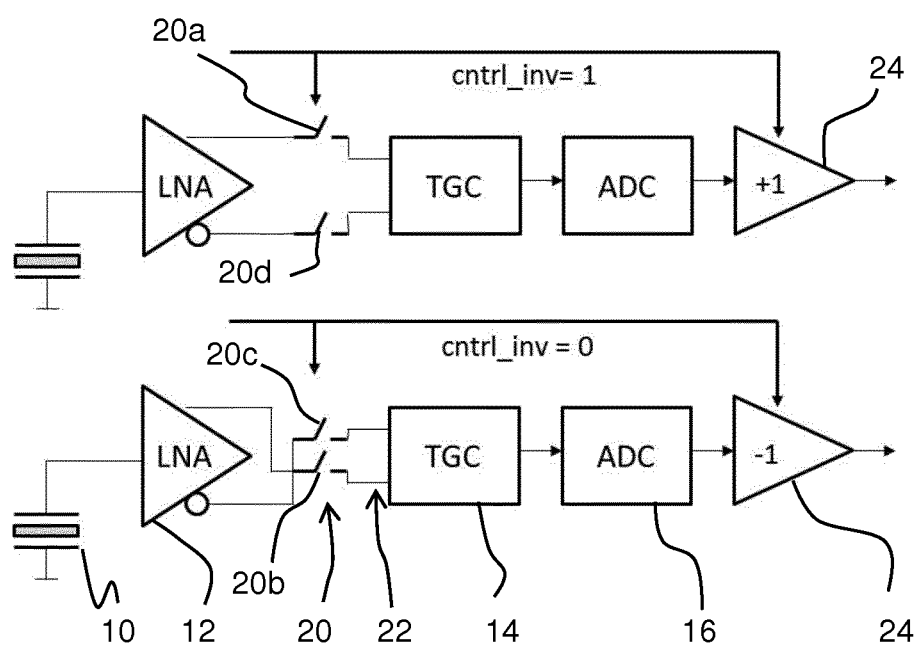
FIG. 3 shows two cycles during use of the system of FIG. 2.

FIG. 3 shows the two cycles mentioned above. The top part shows the non-inverting first cycle with cntrl_inv=1 and the bottom part shows the inverting second cycle with cntrl_inv=0.

The switch arrangement 20 comprises four switches, with a first 20a between a first amplifier output and a first time gain compensation circuit input, a second 20b between the first amplifier output and a second time gain compensation circuit input, a third 20c between a second amplifier output and the first time gain compensation circuit input and a fourth 20d between the second amplifier output and the second time gain compensation circuit input. In FIG. 3 only the switches that will be closed to perform a routing function are shown, but all are shown in FIG. 2.

In one approach, all channels are driven with cntrl_inv=0 and then all channels are driven with cntrl_inv=1. The same channel signal is added to itself at two time points. This requires two cycles to perform the analysis so that the effective frame rate is halved (although two cycles are needed in any case for a pulse inversion scheme as discussed further below).

In another approach, half of the channels (a first sub-group) may be driven by cntrl_inv=1 and the other half of the channels may be driven by cntrl_inv=0 (a second sub-group 2). The elements in the two sub-groups optionally can change with beamforming angles.

In this case, one channel signal with cntrl_inv=0 is added to another adjacent channel with cntrl_inv=1. This enables the frame rate to be preserved but will halve the resolution of the image. In this case, it is required to ensure that signals from these paired elements are not in anti-phase as this will negatively impact the cancelling function.

These approaches provide cancellation of structural even harmonic distortion in the TGC circuit 14 and the ADC 16.

Figure 4:
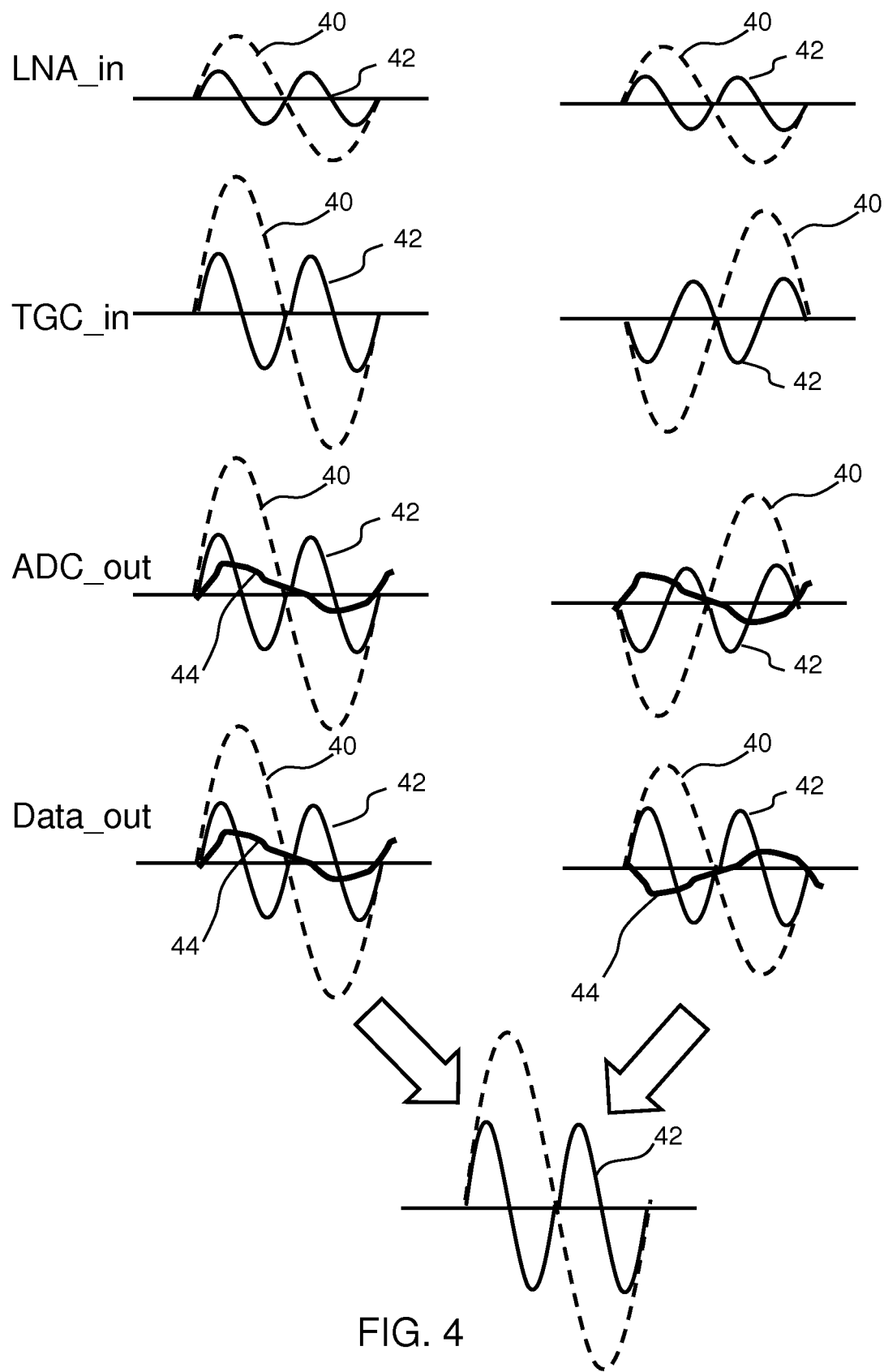
FIG. 4 shows the signals which arise in a first example of the system for the two cycles.

FIG. 4 shows the signals which arise in the system for two cycles. The left column is for non-inverted signals during the first type of cycle and the right column is for inverted signals during the second type of cycle.

The top row shows waveforms received by the amplifier 12. The signals comprise the reflected fundamental 40 and a received second harmonic 42, having double the frequency. Higher order harmonics (>=3) are not shown in order to keep the diagrams simple.

FIG. 4 shows only a single reflected pulse. This is a simplification in that multiple superposed reflected pulses will be received. FIG. 4 is a simplification used to explain the nature of the distortion cancellation. The period of the fundamental 40 is the same as the Tx pulse period (e.g. 0.4 μs).

The second row shows waveforms received by the time gain compensation circuit 14, after the switching arrangement 20. The signals are all amplified compared to the top row and all are inverted in the right column.

The third row is an analog representation of the digital output of the analog to digital converter 16. An added even electronic distortion component 44 is present which originates in the TGC circuit 14 and the ADC 16.

The fourth row is an analog representation of the output data Data_out after the inverter 24. The signal is unchanged in the left column but all is inverted in the right column.

In the right column, the even harmonics of distortion component 44 have undergone one inversion whereas the signal of interest 42 has undergone two inversions.

The two Data_out signals are combined as shown, and the result is the cancellation of the distortion component 44.

The combination is for example made between two signals at two sequential times (as indicated above). It is assumed that the fundamental signals are highly correlated and that they dominate the distortion in the ADC 16 and the TGC circuit 14.

This approach provides cancellation of even harmonic distortion.

A modification enables the cancellation of odd and even harmonic distortion, by using a pulse inversion scheme. Odd harmonic distortion is for example likely to happen due to slew-rate limitations or systematic ADC linearity errors. Transmit pulse inversion is a well-known technique in ultrasound harmonic imaging. The inversion scheme of the signal processing circuit is synchronized with the transmit pulse inversion scheme. As a result, the TGC circuit 14 and the ADC 16 will see identical fundamental signals during both transmission events which results in cancellation of all distortion after combining the output signals in the digital domain.

Figure 5:
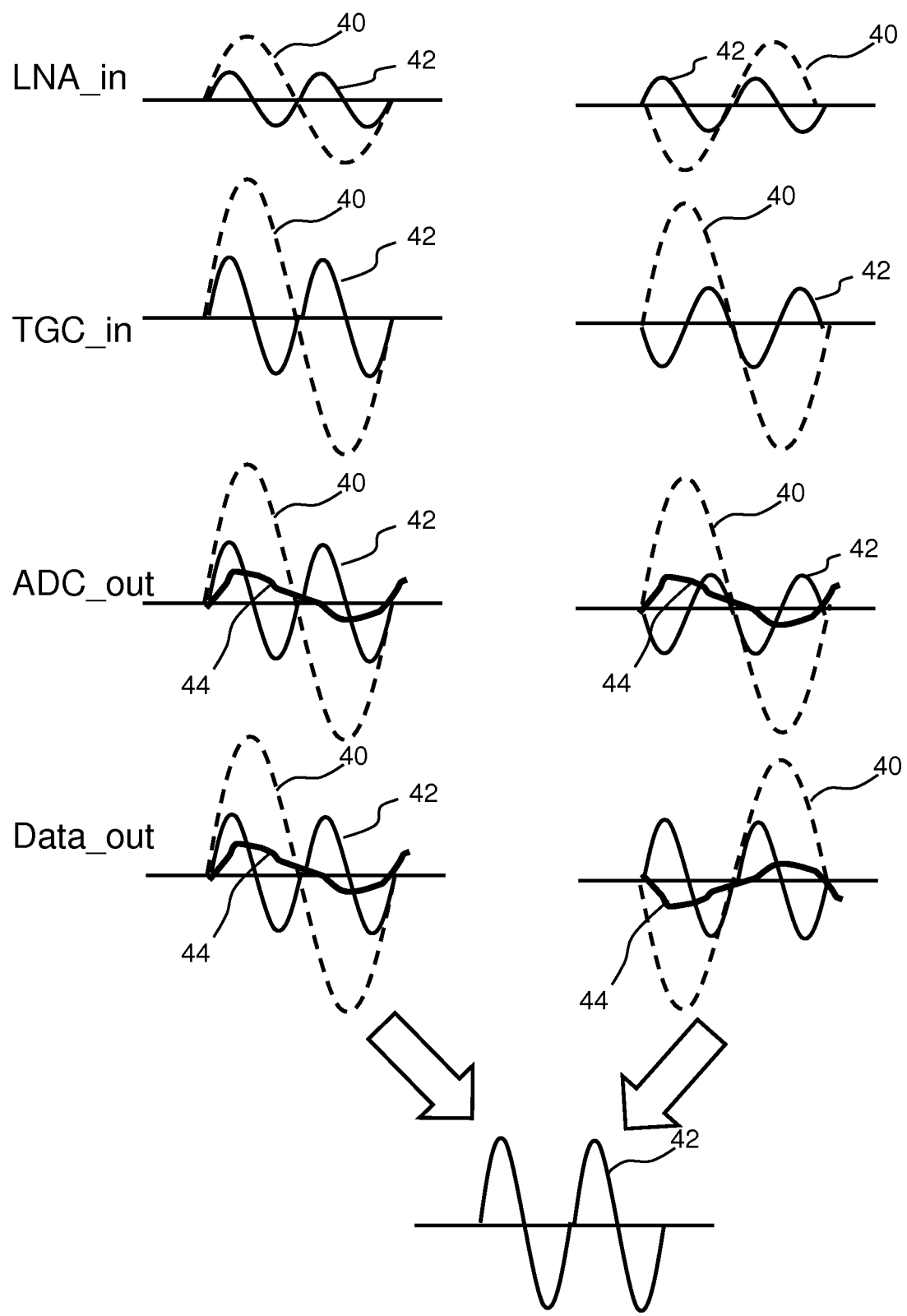
FIG. 5 shows the signals which arise in a second example of the system for the two cycles.

FIG. 5 shows the signals in the system using the same notation as in FIG. 4.

The top row shows waveforms received by the amplifier 12. The signals comprise the reflected fundamental 40 and a received second harmonic 42, having double the frequency. Higher order harmonics are not shown in order to keep the diagrams simple. The fundamental 40 is inverted in the second column and this is the result of the transmit pulse inversion scheme.

The even harmonics have a polarity independent of the polarity of the fundamental, hence the signal 42 has the same polarity in both columns.

The second row shows waveforms received by the time gain compensation circuit 14, after the switching arrangement 20. The signals are all amplified compared to the top row and they all are inverted in the right column.

The third row is an analog representation of the digital output of the analog to digital converter 16. The added electronic distortion component 44 is again present which originates in the TGC circuit 14 and the ADC 16.

The fourth row is an analog representation of the output data Data_out after the inverter 24. The signal is unchanged in the left column but all is inverted in the right column.

In the right column, the distortion 44 has again undergone one inversion whereas the signal of interest 42 has undergone two inversions.

The two Data-out signals are combined as shown, and the result is the cancellation of the distortion component 44 but also the fundamental in this case.

The same assumptions, that the fundamental signals are highly correlated and that they dominate the distortion in the ADC 16 and TGC circuit 14, apply.

It is possible to integrate the LNAs, the TGC circuits and the ADCs in the same ASIC so that the full circuit of FIG. 2 is a single ASIC.

An alternative shown in FIG. 6 is to integrate the LNAs in a first ASIC 60 (optionally together with the transducer elements) and to integrate the TGC circuits and ADCs in a second ASIC 62. In this case, each LNA 12 may have a single-ended output to limit the number of signal connections between the first ASIC 60 and the second ASIC 62. Thus a reference Vref functions as a second input to the switch arrangement 20.

The signal can in this way be turned into a quasi-differential signal (e.g. by using AC coupling as shown) at the input of the second ASIC 62. A two-chip solution benefits from the freedom to choose different and optimized ASIC technologies for both purposes.

The general operation of an exemplary ultrasound diagnostic imaging system will now be described, with reference to FIG. 7. This is to illustrate the general type of device to which the method and system of the invention may be applied.

The system comprises a transducer probe which has a CMUT transducer array 105 for transmitting ultrasound waves and receiving echo information. The transducer array 105 includes transducers 110 (e.g., transducer elements 10), which may alternatively comprise piezoelectric transducers formed of materials such as PZT or PVDF. The transducers 110 could also be composed of CMUT elements. The transducer array 105 is a two-dimensional array of the transducers 110 capable of scanning in a 2D plane or in three dimensions for 3D imaging. In another example, the transducer array 105 may be a 1D array.

In the example shown, the transducer array 105 is coupled to a microbeamformer 112 in the probe which controls reception of signals by the CMUT array cells or piezoelectric elements. Microbeamformers are capable of at least partial beamforming of the signals received by sub-arrays (or "groups" or "patches") of transducers as described in U.S. Pat. No. 5,997,479 (Savord et al.), U.S. Pat. No. 6,013,032 (Savord), and U.S. Pat. No. 6,623,432 (Powers et al.).

Note that the microbeamformer 112 is entirely optional. For example, microbeamformers are not always used in 1D arrays. Also, when performing plane wave imaging to receive very high framerates, microbeamformers are less attractive as they prevent retrospective beamforming in various steering/focusing directions.

The microbeamformer 112 is coupled by the probe cable to a transmit/receive (T/R) switch 116 which switches between transmission and reception and protects the main beamformer 120 from high energy transmit signals when a microbeamformer is not used and the transducer array 105 is operated directly by the main system beamformer. The transmission of ultrasound beams from the transducer array 105 is directed by a transducer controller 118 coupled to the microbeamformer by the T/R switch 116 and a main transmission beamformer (not shown), which receives input from the user's operation of the control panel or user interface 138.

One of the functions controlled by the transducer controller 118 is the direction in which beams are steered and focused. Beams may be steered straight ahead from (orthogonal to) the transducer array 105, or at different angles for a wider field of view. The transducer controller 118 can be coupled to control a DC bias control 145 for the CMUT array. The DC bias control 145 sets DC bias voltage(s) that are applied to the CMUT cells.

In the reception channel, partially beamformed signals are produced by the microbeamformer 112 and are coupled to a receive main beamformer 120 where the partially beamformed signals from individual patches of transducers are combined into a fully beamformed signal. For example, the main beamformer 120 may have 128 channels, each of which receives a partially beamformed signal from a patch of dozens or hundreds of CMUT transducer cells or piezoelectric elements. In this way the signals received by thousands of transducers of a transducer array 105 can contribute efficiently to a single beamformed signal.

The beamformed reception signals are coupled to a signal processor 122. The signal processor 122 can process the received echo signals in various ways, such as band-pass filtering, decimation, I and Q component separation, and harmonic signal separation which acts to separate linear and nonlinear signals so as to enable the identification of nonlinear (higher harmonics of the fundamental frequency) echo signals returned from tissue and microbubbles. The signal processor may also perform additional signal enhancement such as speckle reduction, signal compounding, and noise elimination. The band-pass filter in the signal processor can be a tracking filter, with its pass band sliding from a higher frequency band to a lower frequency band as echo signals are received from increasing depths, thereby rejecting the noise at higher frequencies from greater depths where these frequencies are devoid of anatomical information.

The beamformers for transmission and for reception are typically implemented in different hardware and can have different functions. Of course, the receiver beamformer is designed to take into account the characteristics of the transmission beamformer. In FIG. 7 only the receiver beamformers 112, 120 are shown, for simplicity. In the complete system, there will also be a transmission chain with a transmission micro beamformer, and a main transmission beamformer.

The function of the microbeamformer 112 is to provide an initial combination of signals in order to decrease the number of analog signal paths. This is typically performed in the analog domain.

The final beamforming is done in the main beamformer 120 and is typically after digitization.

The transmission and reception channels use the same transducer array 105 which has a fixed frequency band. However, the bandwidth that the transmission pulses occupy can vary depending on the transmission beamforming that has been used. The reception channel can capture the whole transducer bandwidth (which is the classic approach) or by using bandpass processing it can extract only the bandwidth that contains the useful information (e.g. the harmonics of the main harmonic).

The processed signals are coupled to a B mode (i.e. brightness mode, or 2D imaging mode) processor 126 and a Doppler processor 128. The B mode processor 126 employs detection of an amplitude of the received ultrasound signal for the imaging of structures in the body such as the tissue of organs and vessels in the body. B mode images of structure of the body may be formed in either the harmonic image mode or the fundamental image mode or a combination of both as described in U.S. Pat. No. 6,283,919 (Roundhill et al.) and U.S. Pat. No. 6,458,083 (Jago et al.) The Doppler processor 128 processes temporally distinct signals from tissue movement and blood flow for the detection of the motion of substances such as the flow of blood cells in the image field. The Doppler processor 128 typically includes a wall filter with parameters which may be set to pass and/or reject echoes returned from selected types of materials in the body.

The structural and motion signals produced by the B mode and Doppler processors are coupled to a scan converter 132 and a multi-planar reformatter 144. The scan converter 132 arranges the echo signals in the spatial relationship from which they were received in a desired image format. For instance, the scan converter may arrange the echo signal into a two dimensional (2D) sector-shaped format, or a pyramidal three dimensional (3D) image. The scan converter can overlay a B mode structural image with colors corresponding to motion at points in the image field with their Doppler-estimated velocities to produce a color Doppler image which depicts the motion of tissue and blood flow in the image field. The multi-planar reformatter will convert echoes which are received from points in a common plane in a volumetric region of the body into an ultrasound image of that plane, as described in U.S. Pat. No. 6,443,896 (Detmer). A volume renderer 142 converts the echo signals of a 3D data set into a projected 3D image as viewed from a given reference point as described in U.S. Pat. No. 6,530,885 (Entrekin et al.).

The 2D or 3D images are coupled from the scan converter 132, multi-planar reformatter 144, and volume renderer 142 to an image processor 130 for further enhancement, buffering and temporary storage for display on a display device 140. In addition to being used for imaging, the blood flow values produced by the Doppler processor 128 and tissue structure information produced by the B mode processor 26 are coupled to a quantification processor 134. The quantification processor 134 produces measures of different flow conditions such as the volume rate of blood flow as well as structural measurements such as the sizes of organs and gestational age. The quantification processor 134 may receive input from the user interface 138, such as the point in the anatomy of an image where a measurement is to be made. Output data from the quantification processor 134 is coupled to a graphics processor 136 for the reproduction of measurement graphics and values with the image on the display device 140, and for audio output from the display device 140. The graphics processor 136 can also generate graphic overlays for display with the ultrasound images. These graphic overlays can contain standard identifying information such as patient name, date and time of the image, imaging parameters, and the like. For these purposes the graphics processor receives input from the user interface 138, such as patient name. The user interface 138 is also coupled to the transmit controller 118 to control the generation of ultrasound signals from the transducer array 105 and hence the images produced by the transducer array 105 and the ultrasound system. The transmit control function of the controller 118 is only one of the functions performed. The controller 118 also takes account of the mode of operation (given by the user) and the corresponding required transmitter configuration and band-pass configuration in the receiver analog to digital converter. The controller 118 can be a state machine with fixed states.

The user interface 138 is also coupled to the multi-planar reformatter 144 for selection and control of the planes of multiple multi-planar reformatted (MPR) images which may be used to perform quantified measures in the image field of the MPR images.

A processor arrangement may be adapted to perform any part of the method described above and hence implement the controller function. The processor arrangement may, for instance, be included in one or more of the previously described processors, such as the controller 118 and the signal processing may be performed in the existing signal processor 122. The quantification processor 134 and the graphics processor 136 may also be used. Alternatively, the processor arrangement for implementing the controller used in the method of the invention may be an additional module.

FIG. 8 shows a method of processing ultrasound signals comprising:

in step 200, receiving signals from an array of ultrasound transducer elements, and at each transducer element:

in step 202, amplifying the respective signal;

in step 204 generating an intermediate two-terminal output from the amplified signal, selectively either directly or with inversion;

in step 206 performing time gain compensation to the intermediate two-terminal output;

in step 208 performing analog to digital conversion; and in step 210 selectively performing inversion of the digital signal synchronously with the inversion used to generate the intermediate signal.

Signals with opposite inversion settings are combined in step 212.

While the invention has been described with respect to specific examples including presently preferred modes of carrying out the invention, those skilled in the art will appreciate that there are numerous variations and permutations of the above described embodiments, including substitution of specific elements by others technically equivalent, without departing from the scope of the invention as set forth in the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An ultrasound probe comprising:
    a plurality of ultrasound transducer elements arranged in an array, wherein the ultrasound transducer elements are configured to emit ultrasound pulses, receive reflected ultrasound pulses, and output corresponding signals; and
    a plurality of signal processing circuits associated with the plurality of ultrasound transducer elements, respectively, wherein each signal processing circuit comprises:
    an amplifier configured to amplify a signal received from an ultrasound transducer element of the plurality of ultrasound transducer elements and to output an amplified signal;
    a switch arrangement at an output of the amplifier, wherein the switch arrangement is configured to receive the amplified signal from the amplifier and to generate an intermediate two-terminal output, by selectively outputting the amplified signal directly or with inversion;
    a time gain compensation circuit configured to perform time gain compensation of the intermediate two-terminal output;
    an analog to digital converter (ADC) at an output of the time gain compensation circuit, wherein the ADC is configured to digitize the intermediate two-terminal output to provide a digital signal; and
    an inverter at an output of the ADC, wherein the inverter is configured to selectively invert the digital signal, synchronously with the switch arrangement outputting the amplified signal with inversion.

2. The ultrasound probe of claim 1, further comprising:
    a controller configured to control the plurality of ultrasound transducer elements to emit the ultrasound pulses, to control the switch arrangement to selectively invert the amplified signal from the amplifier, and to control the inverter to selectively invert the digital signal synchronously with the switch arrangement.

3. The ultrasound probe of claim 2, wherein the controller is configured to control the switch arrangement and the inverter in two cycles, wherein the two cycles comprise:
    a first cycle in which the switch arrangement and the inverter each provide no inversion; and
    a second cycle in which the switch arrangement and the inverter each provide inversion.

4. The ultrasound probe of claim 3, wherein the controller is further configured to switch between the first and second cycles between the emissions of the ultrasound pulses.

5. The ultrasound probe of claim 2, further comprising:
    a signal processor configured to process the digital signal from the ADC, wherein the processing comprises combining the digital signal corresponding to the reflected ultrasound pulses for successive first and second cycles.

6. The ultrasound probe of claim 5, wherein the controller is further configured to apply opposite polarity to successive emissions of the emissions of ultrasound pulses.

7. The ultrasound probe of claim 5, wherein the signal processor is further configured to process harmonics of a fundamental frequency of the emitted ultrasound pulses.

8. The ultrasound probe of claim 1, wherein the inverter comprises a bit inverter configured to invert a most significant bit of the digital signal provided by the ADC.

9. The ultrasound probe of claim 1, wherein the amplified signal output by the amplifier is a differential signal.

10. The ultrasound probe of claim 1, wherein the switch arrangement comprises a first switch between a first amplifier output and a first time gain compensation circuit input, a second switch between the first amplifier output and a second time gain compensation circuit input, a third switch between a second amplifier output and the first time gain compensation circuit input, and a fourth switch between the second amplifier output and the second time gain compensation circuit input.

11. A method of processing ultrasound signals, the method comprising:
    receiving signals from a plurality of ultrasound transducer elements of an ultrasound probe, respectively, and for each ultrasound transducer element:
    amplifying the signal respectively received at the ultrasound transducer element;
    generating intermediate two-terminal output from the amplified signal by selectively outputting the amplified signal directly or with inversion;
    performing time gain compensation on the intermediate two-terminal output;
    performing analog to digital conversion on the intermediate two-terminal output to provide a digital signal; and selectively performing inversion of the digital signal using an inverter synchronously with the inversion of the amplified signal used to generate the intermediate two-terminal output.

12. The method of claim 11, further comprising:
controlling the plurality of ultrasound transducer elements to emit ultrasound pulses, receive reflected ultrasound pulses, and output the signals received from the plurality of ultrasound transducer elements, which correspond to the received reflected ultrasound pulses; and
controlling a switch arrangement to generate the intermediate two-terminal output from each ultrasound transducer element of the plurality of ultrasound transducer elements according to two cycles, wherein the two cycles comprise:
a first cycle in which the switch arrangement and the inverter each provide no inversion; and
a second cycle in which the switch arrangement and the inverter each provide inversion.

13. The method of claim 12, wherein the first and the second cycle are successive cycles, the method further comprising:
combining the received reflected ultrasound pulses for the successive first and second cycles.

14. The method of claim 12, further comprising:
applying opposite polarity to successive emissions of the ultrasound pulses.

15. A non-transitory computer readable medium storing computer program code that, when executed by at least one processor, cause the at least one processor to implement the method of claim 11.

16. An ultrasound probe comprising:
an plurality of ultrasound transducer elements; and
a plurality of signal processing circuits associated with the plurality of ultrasound transducer elements, respectively, wherein each signal processing circuit comprises:
an amplifier configured to amplify a received signal from an ultrasound transducer element of the plurality of ultrasound transducer elements and to output an amplified signal, wherein the amplifier comprises a first amplifier output and a second amplifier output for outputting the amplified signal;
a time gain compensation (TGC) circuit comprising a first TGC circuit input and a second TGC circuit input;
a switch arrangement configured to generate an intermediate two-terminal output by selectively outputting the amplified signal directly or with inversion, wherein the switch arrangement comprises a first switch between the first amplifier output and the first TGC circuit input, a second switch between the first amplifier output and the second TGC circuit input, a third switch between the second amplifier output and the first TGC circuit input, and a fourth switch between the second amplifier output and the second TGC circuit input;
an analog to digital converter (ADC) connected to an output of the TGC circuit; and
an inverter at an output of the ADC, wherein the inverter is controlled synchronously with the switch arrangement to invert the output of the ADC.

17. The ultrasound probe of claim 16, further comprising:
a controller configured to control the ultrasound transducer elements to emit ultrasound pulses, to control the switch arrangement to selectively invert the amplified signal from the amplifier, and to control the inverter to selectively invert an output of the ADC synchronously with the switch arrangement.

18. The ultrasound probe of claim 17, wherein the controller is configured to control the switch arrangement and the inverter in two cycles, wherein the two cycles comprise:
a first cycle in which the switch arrangement and the inverter each provide no inversion; and
a second cycle in which the switch arrangement and the inverter each provide inversion.

19. The ultrasound probe of claim 18, wherein the controller is further configured to switch between the first and second cycles between emissions of the ultrasound pulses.

20. The ultrasound probe of claim 16, wherein the inverter comprises a bit inverter configured to invert a most significant bit of the digital signal output by the ADC.

* * * * *